(12) United States Patent
Kim et al.

(10) Patent No.: US 9,975,979 B2
(45) Date of Patent: May 22, 2018

(54) METHOD OF PREPARING SUPERABSORBENT POLYMER

(71) Applicant: LG Chem, Ltd., Seoul (KR)

(72) Inventors: Kyu Pal Kim, Daejeon (KR); Chang Sun Han, Daejeon (KR)

(73) Assignee: LG Chem, Ltd. (KR)

( * ) Notice: Subject to any disclaimer, the term of this patent is extended or adjusted under 35 U.S.C. 154(b) by 0 days. days.

(21) Appl. No.: 15/502,592

(22) PCT Filed: Oct. 8, 2015

(86) PCT No.: PCT/KR2015/010682
§ 371 (c)(1),
(2) Date: Feb. 8, 2017

(87) PCT Pub. No.: WO2016/056866
PCT Pub. Date: Apr. 14, 2016

(65) Prior Publication Data
US 2017/0226248 A1    Aug. 10, 2017

(30) Foreign Application Priority Data
Oct. 8, 2014    (KR) .................. 10-2014-0135921

(51) Int. Cl.
| C08F 220/06 | (2006.01) |
| C08J 3/24 | (2006.01) |
| B01J 20/26 | (2006.01) |

(52) U.S. Cl.
CPC ........... C08F 220/06 (2013.01); B01J 20/267 (2013.01); C08J 3/245 (2013.01); C08J 2333/02 (2013.01)

(58) Field of Classification Search
CPC ........ C08F 220/06; B01J 20/267; B01J 20/26; C08J 3/245
USPC ...................................................... 502/402
See application file for complete search history.

(56) References Cited

U.S. PATENT DOCUMENTS

| 5,002,986 A | 3/1991 | Fujiura et al. |
| 5,064,582 A | 11/1991 | Sutton et al. |
| 5,164,459 A | 11/1992 | Kimura et al. |
| 2005/0245393 A1 | 11/2005 | Herfert et al. |
| 2005/0256468 A1 | 11/2005 | Qin et al. |
| 2006/0247351 A1 | 11/2006 | Torii et al. |
| 2008/0214749 A1 | 9/2008 | Weismantel et al. |
| 2009/0318633 A1 | 12/2009 | Funk et al. |
| 2010/0324212 A1 | 12/2010 | Stueven et al. |
| 2011/0110730 A1 | 5/2011 | Nogi et al. |
| 2011/0118430 A1 | 5/2011 | Funk et al. |
| 2011/0301303 A1 | 12/2011 | Kim et al. |
| 2012/0258851 A1 | 10/2012 | Nakatsuru et al. |
| 2014/0051813 A1 | 2/2014 | Won et al. |
| 2014/0107305 A1 | 4/2014 | Funk et al. |
| 2015/0259522 A1 | 9/2015 | Lee et al. |

FOREIGN PATENT DOCUMENTS

| DE | 102005014291 A1 | 9/2006 |
| EP | 2258749 A1 | 12/2010 |
| JP | 56161408 A | 12/1981 |
| JP | S57-158209 A | 9/1982 |
| JP | S57198714 U | 12/1982 |
| JP | H07179613 A | 7/1995 |
| JP | 2001079829 A | 3/2001 |
| JP | 2001224959 A | 8/2001 |
| JP | 3961622 B2 | 8/2007 |
| JP | 4132592 B2 | 8/2008 |
| JP | 5047616 B2 | 10/2012 |
| JP | 5064032 B2 | 10/2012 |
| JP | 5323053 B2 | 10/2013 |
| KR | 0143403 B1 | 7/1998 |
| KR | 20050035975 A | 4/2005 |
| KR | 20050036975 A | 4/2005 |
| KR | 20110134333 A | 12/2011 |
| KR | 10-1154568 B1 | 6/2012 |
| KR | 20120059169 A | 6/2012 |
| KR | 20120132475 A | 12/2012 |
| KR | 20140063457 A | 5/2014 |
| WO | 2006101271 A1 | 9/2006 |
| WO | 2007074167 A2 | 7/2007 |
| WO | 2009077100 A1 | 6/2009 |
| WO | 2009109563 A1 | 9/2009 |
| WO | 2009153196 A1 | 12/2009 |
| WO | 2010006937 A1 | 1/2010 |

OTHER PUBLICATIONS

International Search Report from PCT/KR2015/010682, dated Feb. 3, 2016.
Schwalm, Reinhold, "UV Coatings—Basics, Recent Developments and New Applications." Elsevier Science, Dec. 21, 2006, p. 115.
Odian, George, "Principles of Polymerization." John Wiley & Sons, Second Edition, Copyright 1981, p. 203.
Extended European Search Report for Application No. EP15848299.2 dated Oct. 23, 2017.

*Primary Examiner* — Edward Johnson
(74) *Attorney, Agent, or Firm* — Lerner, David, Littenberg, Krumholz & Mentlik, LLP

(57) ABSTRACT

A method of preparing a superabsorbent polymer is provided. The method of preparing the superabsorbent polymer according to the present disclosure is able to provide the superabsorbent polymer having an improved absorption rate while having superior centrifuge retention capacity (CRC) and absorbency under pressure (AUP).

11 Claims, No Drawings

METHOD OF PREPARING SUPERABSORBENT POLYMER

CROSS-REFERENCE TO RELATED APPLICATION

The present application is a national phase entry under 35 U.S.C. § 371 of International Application No. PCT/KR2015/010682 filed on Oct. 8, 2015, which claims priority from Korean Patent Application No. 10-2014-0135921 filed on Oct. 8, 2014 with the Korean Intellectual Property Office, the disclosures of which are incorporated herein by reference in their entirety.

TECHNICAL FIELD

The present disclosure relates to a method of preparing a superabsorbent polymer.

BACKGROUND OF ART

A superabsorbent polymer (SAP) is a synthetic polymeric material capable of absorbing moisture at about 500 to 1000 times its own weight, and is also called a SAM (super absorbency material), an AGM (absorbent gel material), etc. Since superabsorbent polymers started to be practically applied in sanitary products, they have now been widely used not only for hygiene products such as disposable diapers for children, etc., but also for water retaining soil products for gardening, water stop materials for civil engineering and construction, sheets for raising seedlings, fresh-keeping agents for food distribution fields, and the like.

As a preparation process for such superabsorbent polymers, a process of reverse phase suspension polymerization and a process of solution polymerization have been known. Of them, preparation of the superabsorbent polymer by reverse phase suspension polymerization is disclosed in, for example, Japanese Patent Laid-open Publication Nos. S56-161408, S57-158209, S57-198714, etc.

Further, preparation of the superabsorbent polymer by the solution polymerization further includes a thermal polymerization method in which a water-containing gel polymer is polymerized while being broken and cooled in a kneader equipped with a plurality of shafts, and a photo-polymerization method in which an aqueous solution at a high concentration is irradiated with UV rays on a belt to be polymerized and dried at the same time.

Meanwhile, the absorption rate, which is one of important physical properties of the superabsorbent polymer, is associated with surface dryness of products in contact with skin, such as diapers. Generally, the absorption rate may be improved by increasing the surface area of the superabsorbent polymer.

For example, a method of forming a porous structure on the particle surface of the superabsorbent polymer by using a foaming agent is applied. However, since it is difficult to form a sufficient amount of the porous structure by the foaming agent, there is a drawback that the absorption rate is not greatly increased.

Another example is a method of increasing the surface area by regranulating fine particles obtained during the preparation process of the superabsorbent polymer to form non-uniform porous particles. This method may be used to improve the absorption rate of the superabsorbent polymer, but there is a limitation in that centrifuge retention capacity (CRC) and absorbency under pressure (AUP) of the polymer become relatively low. That is, there is a trade-off between physical properties of the superabsorbent polymer such as absorption rate, centrifuge retention capacity, absorbency under pressure, etc. Accordingly, there is an urgent demand for a preparation method capable of improving these physical properties at the same time.

DETAILED DESCRIPTION OF THE INVENTION

Technical Problem

The present disclosure is intended to provide a method capable of preparing a superabsorbent polymer having an improved absorption rate while having superior centrifuge retention capacity and absorbency under pressure.

Technical Solution

According to the present disclosure, a method of preparing a superabsorbent polymer is provided, the method including:

polymerizing and crosslinking a monomer composition including acrylic acid-based monomers having acidic groups which are at least partially neutralized, in the presence of a polymerization initiator and a first crosslinking agent, to form a water-containing gel polymer;

coarsely pulverizing the water-containing gel polymer;

drying the coarsely pulverized water-containing gel polymer;

pulverizing the dried polymer; and surface-modifying the pulverized polymer by a second crosslinking agent, in which coarse pulverization of the water-containing gel polymer is conducted while mixing a powder of the superabsorbent polymer, which is obtained during the preparation process of the superabsorbent polymer, with the water-containing gel polymer.

Hereinafter, a method of preparing a superabsorbent polymer according to embodiments of the present disclosure will be described.

The terminology used herein is only for the purpose of describing exemplary embodiments, and is not intended to limit the present disclosure. The singular forms used herein may be intended to include the plural forms as well, unless the context clearly indicates otherwise. It will be understood that the term 'include', when used herein, specifies stated features, regions, integers, steps, operations, elements, and/or components, but does not preclude the presence or addition of other features, regions, integers, steps, operations, elements, components, and/or groups thereof.

The 'superabsorbent polymer', a synthetic polymeric material capable of absorbing moisture at about 500 to 1000 times its own weight, may be prepared, for example, by drying and pulverizing a water-containing gel polymer to form polymer particles, and then by crosslinking the surface of the particles. Such superabsorbent polymer may have a structure in which a surface-crosslinked layer is formed by surface crosslinking on an internally crosslinked polymer.

While terms including ordinal numbers, such as 'first', 'second', etc., may be used herein to describe various components, such components are not limited to those terms. The terms are only to distinguish one component from another. For example, a first component may be called a second component, and vice versa, without departing from the scope of the present disclosure.

Through continued studies of the present inventors, they found that when a powder of a superabsorbent polymer is injected upon performing a process of coarsely pulverizing a water-containing gel polymer after formation of the water-containing gel polymer, the powder is uniformly distributed on the surface of the superabsorbent polymer, thereby improving the absorption rate by increasing the surface area while preventing deterioration in physical properties such as centrifuge retention capacity (CRC), absorbency under pressure (AUP), etc.

However, a mixture of the water-containing gel polymer and the powder of the superabsorbent polymer prepared by the above method exhibited a weak binding force, and therefore they were easily separated from each other during the preparation process and a transport process. Accordingly, it was frequently observed that the improvement of physical properties was not achieved or the degree of improvement was not large. To solve this problem, the powder is injected together with a metal sulfate during the process of pulverizing the water-containing gel polymer, and as a result, the powder more strongly binds to the surface of the superabsorbent polymer, thereby stably providing a superabsorbent polymer having an improved absorption rate.

According to an embodiment of the present disclosure, a method of preparing the superabsorbent polymer is provided, the method including:

polymerizing and crosslinking a monomer composition including acrylic acid-based monomers having acidic groups which are at least partially neutralized, in the presence of a polymerization initiator and a first crosslinking agent, to form a water-containing gel polymer;

coarsely pulverizing the water-containing gel polymer;

drying the coarsely pulverized water-containing gel polymer;

pulverizing the dried polymer; and surface-modifying the pulverized polymer by a second crosslinking agent, in which coarse pulverization of the water-containing gel polymer is conducted while mixing the powder of the superabsorbent polymer, which is obtained during the preparation process of the superabsorbent polymer, with the water-containing gel polymer.

Hereinafter, each of the steps that may be included in the method of preparing the superabsorbent polymer according to embodiments of the present disclosure will be described in detail.

Step of Forming Water-Containing Gel Polymer

According to an embodiment of the present disclosure, the water-containing gel polymer may be obtained by a method of polymerizing and crosslinking the monomer composition including acrylic acid-based monomers in the presence of the polymerization initiator and the first crosslinking agent.

Herein, the acrylic acid-based monomer may be a compound represented by the following Chemical Formula 1:

$$R^1\text{—COOM}^1 \qquad [\text{Chemical Formula 1}]$$

wherein $R^1$ is an alkyl group containing an unsaturated bond and having 2 to 5 carbon atoms, and $M^1$ is a hydrogen atom, a monovalent metal, a divalent metal, an ammonium group, or an organic amine salt.

Preferably, the acrylic acid-based monomer may be one or more compounds selected from the group consisting of acrylic acid and methacrylic acid, and a monovalent metal salt, a divalent metal salt, an ammonium salt, and an organic amine salt thereof. When acrylic acid or a salt thereof is used as the acrylic acid-based monomer, it is advantageous in that a superabsorbent polymer having improved absorbency may be obtained.

In addition, as the monomer, maleic anhydride, fumaric acid, crotonic acid, itaconic acid, 2-acryloylethane sulfonic acid, 2-methacryloylethane sulfonic acid, 2-(meth)acryloyl-propane sulfonic acid, or 2-(meth)acrylamide-2-methyl propane sulfonic acid, (meth)acrylamide, N-substituted (meth)acrylate, 2-hydroxyethyl(meth)acrylate, 2-hydroxypropyl (meth)acrylate, methoxy polyethylene glycol(meth)acrylate, polyethylene glycol(meth)acrylate, (N,N)-dimethylamino-ethyl(meth)acrylate, (N,N)-dimethylaminopropyl(meth) acrylamide, etc. may be used.

Here, the acrylic acid-based monomers may be those having acidic groups which are at least partially neutralized. Preferably, the monomers may be those partially neutralized with an alkali substance such as sodium hydroxide, potassium hydroxide, ammonium hydroxide, or the like.

In this regard, a degree of neutralization of the acrylic acid-based monomer may be 40 mol % to 95 mol %, 40 mol % to 80 mol %, or 45 mol % to 75 mol %. The range of the neutralization degree may vary depending on the final physical properties. An excessively high degree of neutralization causes the neutralized monomers to be precipitated, and thus polymerization may not readily occur, whereas an excessively low degree of neutralization not only deteriorates the absorbency of the polymer, but also endows the polymer with hard-to-handle properties, such as those of an elastic rubber.

Further, the concentration of the acrylic acid-based monomer in the monomer composition may be properly controlled in consideration of polymerization time and reaction conditions, and the concentration may preferably be 20% by weight to 90% by weight, or 40% by weight to 70% by weight, which is for using the gel effect during the polymerization reaction in a high-concentration aqueous solution to eliminate a need for removing the unreacted monomer after the polymerization and also for improving pulverization efficiency upon a subsequent pulverization process of the polymer.

However, if the concentration of the monomer is too low, the yield of the superabsorbent polymer may become low. On the contrary, if the concentration of the monomer is too high, there is a process problem that part of the monomers is precipitated, or pulverization efficiency is lowered upon pulverization of the polymerized water-containing gel polymer, and the physical properties of the superabsorbent polymer may be deteriorated.

Meanwhile, the monomer composition may include a polymerization initiator generally used in the preparation of the superabsorbent polymer. As the polymerization initiator, a thermal polymerization initiator or a photo-polymerization initiator may be used depending on a polymerization method. However, even though the photo-polymerization is performed, a certain amount of heat is generated by UV irradiation or the like and is also generated as the exothermic polymerization reaction proceeds. Therefore, the thermal polymerization initiator may be additionally used in the photo-polymerization.

Here, the photo-polymerization initiator may be, for example, one or more compounds selected from the group consisting of benzoin ether, dialkyl acetophenone, hydroxyl alkylketone, phenyl glyoxylate, benzyl dimethyl ketal, acyl phosphine, and α-aminoketone. As the specific example of acyl phosphine, commercial Lucirin TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p 115, which may serve as a reference.

The thermal polymerization initiator may be one or more compounds selected from the group consisting of persulfate-based initiators, azo-based initiators, hydrogen peroxide, and ascorbic acid. Specific examples of the persulfate-based initiators may include sodium persulfate ($Na_2S_2O_8$), potassium persulfate ($K_2S_2O_8$), ammonium persulfate (($NH_4)_2S_2O_8$), or the like. Further, specific examples of the azo-based initiators may include 2,2-azobis(2-amidinopropane) dihydrochloride, 2,2-azobis-(N,N-dimethylene)isobutyramidine dihydrochloride, 2-(carbamoylazo)isobutylonitrile, 2,2-azobis(2-[2-imidazolin-2-yl]propane) dihydrochloride, 4,4-azobis-(4-cyanovaleric acid), or the like. More various thermal polymerization initiators are well-disclosed in "Principles of Polymerization" written by Odian, (Wiley, 1981), p 203, which may serve as a reference.

The polymerization initiator may be added at a concentration of about 0.001% by weight to 1% by weight, based on the monomer composition. That is, if the concentration of the polymerization initiator is too low, the polymerization rate becomes low and thus a large amount of residual monomers may be undesirably extracted from a final product. On the contrary, if the concentration of the polymerization initiator is too high, the polymer chains constituting the network becomes short, and thus the content of water-soluble components is increased and physical properties of the polymer may deteriorate, such as a reduction in absorbency under pressure.

Meanwhile, the monomer composition may further include a crosslinking agent to improve physical properties of the water-containing gel polymer. The crosslinking agent is a first crosslinking agent (internal crosslinking agent) for internal crosslinking of the water-containing gel polymer, and the crosslinking agent is separately used in a subsequent process, independent of the second crosslinking agent (surface crosslinking agent) for surface crosslinking of the water-containing gel polymer.

As the first crosslinking agent, any compound is possible as long as it enables introduction of crosslinkage upon polymerization of the acrylic acid-based monomers. Non-limiting examples of the first crosslinking agent may include multifunctional crosslinking agents, such as N,N'-methylenebisacrylamide, trimethylolpropane tri(meth)acrylate, ethylene glycol di(meth)acrylate, polyethylene glycol(meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof.

The first crosslinking agent may be added at a concentration of about 0.001% by weight to 1% by weight, based on the monomer composition. That is, if the concentration of the first crosslinking agent is too low, the polymer may undesirably have a low absorption rate and low gel strength. On the contrary, if the concentration of the first crosslinking agent is too high, the polymer may have low absorption ability, which is not preferred as an absorbent.

In addition, the monomer composition may further include an additive such as a thickener, a plasticizer, a preservation stabilizer, an antioxidant, etc., if necessary.

The monomer composition may be in the form of a solution, which is prepared by dissolving the raw materials including the acrylic acid-based monomers, the polymerization initiator, the first crosslinking agent, etc. in a solvent. In this regard, any solvent may be used as the useful solvent without limitations in the constitution, as long as it is able to dissolve the above raw materials. For example, water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof may be used as the solvent. The amount of the solvent may be controlled at a weight ratio of 1 to 5 times with respect to the content of the acrylic acid-based monomer, in consideration of the polymerization heat control.

On the other hand, formation of the water-containing gel polymer by polymerizing and crosslinking the monomer composition may be performed by a general polymerization method known in the art to which the present disclosure pertains, and the process is not particularly limited. A non-limiting example of the polymerization method is largely classified into thermal polymerization and photo-polymerization according to a polymerization energy source, and the thermal polymerization may be carried out in a reactor like a kneader equipped with agitating spindles and the photo-polymerization may be carried out in a reactor equipped with a movable conveyor belt.

For example, the monomer composition is injected into a reactor like a kneader equipped with the agitating spindles, and thermal polymerization is performed by providing hot air thereto or heating the reactor so as to obtain the water-containing gel polymer. In this regard, the water-containing gel polymer may have a size of centimeters or millimeters when it is discharged from the outlet of the reactor, according to the type of agitating spindles equipped in the reactor. The water-containing gel polymer may be obtained in various forms according to the concentration of the monomer composition fed thereto, the feeding speed, or the like, and a water-containing gel polymer having a weight average particle size of 2 to 50 mm may be generally obtained.

As another example, when the photo-polymerization of the monomer composition is carried out in a reactor equipped with a movable conveyor belt, the water-containing gel polymer may be obtained as a sheet. In this regard, the thickness of the sheet may vary according to the concentration of the monomer composition fed thereto and the feeding speed, and the polymer sheet is preferably controlled to have a thickness of 0.5 cm to 5 cm in order to uniformly polymerize the entire sheet and secure production speed.

The water-containing gel polymer formed by the above method may have a water content of about 40% by weight to 80% by weight. In terms of optimizing the efficiency of a drying step described below, it is preferable that the water content of the water-containing gel polymer is controlled within the above range. The water content, as used herein, means a water content in the total weight of the water-containing gel polymer, which is obtained by subtracting the weight of the dry polymer from the weight of the water-containing gel polymer. Specifically, the water content is defined as a value calculated by measuring the weight loss according to evaporation of water in the polymer during the drying process of increasing the temperature of the polymer with infrared heating. In this regard, the drying conditions may be determined as follows: the temperature is increased from room temperature to about 180° C. and then the temperature is maintained at 180° C., and a total drying time is determined as 20 min, including 5 min for the temperature rising step.

Step of Coarsely Pulverizing Water-Containing Gel Polymer

According to embodiments of the present disclosure, the water-containing gel polymer obtained by the above-described step is subjected to a drying process in order to provide the water-containing gel polymer with absorbency. In order to increase efficiency of the drying process, the water-containing gel polymer is subjected to a step of (coarsely) pulverizing the water-containing gel polymer, before the drying process.

A non-limiting example of a pulverizing device applicable to the coarse pulverization may include a vertical pulverizer, a turbo cutter, a turbo grinder, a rotary cutter mill, a cutter mill, a disc mill, a shred crusher, a crusher, a chopper, a disc cutter, etc.

In this regard, the coarse pulverization may be performed so that the water-containing gel polymer has a particle size of about 2 mm to about 10 mm. That is, to increase the drying efficiency, the water-containing gel polymer is preferably pulverized to have a particle size of 10 mm or less. However, excessive pulverization may cause agglomeration between particles, and therefore the water-containing gel polymer is preferably pulverized to have a particle size of 2 mm or more.

Particularly, according to embodiments of the present disclosure, when coarse pulverization of the water-containing gel polymer is conducted while mixing the powder of the superabsorbent polymer with the water-containing gel polymer, the superabsorbent polymer in which the powder of the superabsorbent polymer is uniformly distributed on the particle surface may be finally formed. As a result, the surface area of the superabsorbent polymer particle may be increased to achieve an improved absorption rate. Furthermore, this method is significant in that the absorption rate may be improved without reductions in centrifuge retention capacity (CRC) and absorbency under pressure (AUP), which are in a trade-off relationship with the absorption rate of the superabsorbent polymer.

Here, the powder of the superabsorbent polymer may include fine particles obtained during the preparation process of the superabsorbent polymer, granules of the fine particles, or a mixture of the fine particles and the granules. The fine particles may be obtained by size-sorting in a subsequent process of pulverizing the dried polymer, and the fine particles have a smaller particle size (e.g., a particle size of 10 μm to 150 μm) than superabsorbent polymer particles to be commercialized. Such fine particles cause a reduction in physical properties of absorbent polymers, and therefore the fine particles are recovered and used in the form of granules by mixing with an aqueous solvent.

The powder of the superabsorbent polymer may be mixed in an amount of 3 parts by weight to 40 parts by weight, 3 parts by weight to 35 parts by weight, or 5 parts by weight to 30 parts by weight, based on 100 parts by weight of the water-containing gel polymer. That is, in order to ensure the effect of improving the absorption rate of the superabsorbent polymer by the powder distribution, the powder is preferably mixed in an amount of 3 parts by weight or more, based on 100 parts by weight of the water-containing gel polymer. However, when an excessive amount of the powder is mixed, process problems may be generated by the powder. Further, since the powder has low centrifuge retention capacity (CRC) and absorbency under pressure (AUP), it is difficult to avoid deterioration of physical properties of the superabsorbent polymer when an excessive amount of the powder is mixed. Therefore, it is preferable that the content of the powder is controlled within the above-described range.

Further, according to embodiments of the present disclosure, coarse pulverization of the water-containing gel polymer may be conducted while mixing the powder of the superabsorbent polymer and a metal sulfate with the water-containing gel polymer.

That is, upon coarse pulverization, a metal sulfate may be further added, together with the powder. The metal sulfate enables the powder to more strongly bind to the surface of the superabsorbent polymer, and therefore the superabsorbent polymer including the same may have a more stable and improved absorption rate.

The metal sulfate may be mixed in an amount of 0.01 parts by weight to 20 parts by weight, 0.05 parts by weight to 15 parts by weight, or 0.1 parts by weight to 15 parts by weight, based on 100 parts by weight of the water-containing gel polymer. That is, in order to ensure the effect of improving binding force of the powder to the superabsorbent polymer, the metal sulfate is preferably mixed in an amount of 0.01 parts by weight or more, based on 100 parts by weight of the water-containing gel polymer. However, when an excessive amount of the metal sulfate is mixed, there is a problem that absorbency of the polymer is reduced. Therefore, it is preferable that the content of the metal sulfate is controlled within the above-described range.

The metal sulfate may be one or more compounds selected from the group consisting of zinc sulfate, magnesium sulfate, aluminum sulfate, iron sulfate, and zirconium sulfate.

In the coarse pulverization which is performed before drying the water-containing gel polymer, the polymer may stick to the surface of the pulverizing device because it has a high water content. In order to minimize this phenomenon, steam, water, a surfactant, an anti-agglomeration agent (e.g., clay, silica, etc.), a persulfate-based initiator, an azo-based initiator, hydrogen peroxide, an epoxy-based crosslinking agent, a diol-based crosslinking agent, a crosslinking agent including 2-functional or 3 or more-functional acrylate, or a mono-functional crosslinking agent including a hydroxyl group may be added during the coarse of pulverization, if necessary.

Step of Drying Coarsely Pulverized Water-Containing Gel Polymer

According to embodiments of the present disclosure, the water-containing gel polymer coarsely pulverized by the above-described step is subjected to a drying process.

As the water-containing gel polymer is supplied to the drying step in a state of being pulverized into particles of 2 mm to 10 mm through the above-described step, drying may be performed with higher efficiency.

The drying of the coarsely pulverized water-containing gel polymer may be performed at a temperature of 120° C. to 250° C., 140° C. to 200° C., or 150° C. to 190° C. In this regard, the drying temperature is defined as a temperature of a heating medium provided for drying, or a temperature of a drying reactor including the heating medium and the polymer during the drying process. If the drying temperature is low, and therefore the drying time becomes long, the process efficiency may be decreased. In order to prevent this problem, the drying temperature is preferably 120° C. or higher. In addition, when the drying temperature is higher than necessary, the surface of the water-containing gel polymer is excessively dried, and thus there is a concern about generation of fine particles during the subsequent pulverization process and deterioration of the physical properties of the finally formed polymer. In order to prevent this problem, therefore, the drying temperature is preferably 250° C. or lower.

In this regard, the drying time in the drying step is not particularly limited, but may be controlled to 20 to 90 min at the above drying temperature, in consideration of process efficiency and physical properties of the polymer.

The drying may be carried out by using a general medium, and for example, the coarsely pulverized water-containing gel polymer may be supplied with hot air, or irradiated with infrared rays, microwaves, ultraviolet rays, or the like.

When the drying step as above is finished, the water content of the dried polymer may preferably be about 0.1% by weight to about 10% by weight. In other words, if the water content of the dried polymer is less than 0.1% by weight, production costs may be increased and degradation of the crosslinked polymer may undesirably occur due to excessive drying. If the water content of the dried polymer is more than 10% by weight, defective products may be undesirably produced in a subsequent process.

Step of Pulverizing Dried Polymer

According to embodiments of the present disclosure, a step of pulverizing the polymer which is dried by the above-described step is performed.

The pulverization step is a step of optimizing the surface area of the dried polymer, whereby the pulverized polymer has a particle size of 150 μm to 850 μm. In this regard, a pulverizing device may include a generally used pin mill, hammer mill, screw mill, roll mill, disc mill, jog mill, or the like.

Further, a step of selectively size-sorting the polymer particles having a particle size of 150 μm to 850 μm from the polymer particles obtained through the pulverization step may be further performed in order to manage physical properties of the superabsorbent polymer finally produced.

Step of Surface-Modifying Pulverized Polymer

According to embodiments of the present disclosure, a step of surface-modifying the polymer which is pulverized by the above-described step is performed in the presence of the second crosslinking agent.

The surface modification is a step of producing the superabsorbent polymer having more improved physical properties by inducing surface-crosslinking of the surface of the pulverized polymer in the presence of the second crosslinking agent (surface crosslinking agent). A surface crosslinking layer may be formed on the surface of the pulverized polymer particles by the surface-modification.

The surface modification may be performed by a general method of increasing crosslinking density of the surface of the polymer particle, and for example, a solution including the second crosslinking agent (surface crosslinking agent) may be mixed with the pulverized polymer to allow crosslinking reaction.

Here, as long as the second crosslinking agent is a compound that may react with the functional group of the polymer, it may be used without limitation in the constitution thereof. Non-limiting examples of the second crosslinking agent may include one or more compounds selected from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylol propane, pentaerythritol, sorbitol, calcium hydroxide, magnesium hydroxide, aluminum hydroxide, iron hydroxide, calcium chloride, magnesium chloride, aluminum chloride, and iron chloride.

The content of the second crosslinking agent may be properly controlled according to the type of the crosslinking agent or reaction conditions, and the content is preferably 0.001 parts by weight to 5 parts by weight based on 100 parts by weight of the pulverized polymer. If the content of the second crosslinking agent is too low, surface modification may hardly occur to deteriorate physical properties of the final polymer. On the contrary, if the second crosslinking agent is excessively used, excessive surface crosslinking reaction may occur, leading to deterioration in absorption ability of the polymer.

The surface modification step may be performed by a general method, such as a method of feeding the second crosslinking agent and the pulverized polymer to the reactor and mixing them, a method of spraying the second crosslinking agent to the pulverized polymer, or a method of mixing the pulverized polymer and the second crosslinking agent while continuously feeding them to a mixer being continuously operated.

The second crosslinking agent may be added with water. When the second crosslinking agent is added together with water, the second crosslinking agent may be evenly dispersed, agglomeration of the polymer particles may be prevented, and the penetrating depth of the second crosslinking agent into the polymer particles may be optimized. Considering these purposes and effects, the amount of water added with the second crosslinking agent may be 0.5 parts by weight to 10 parts by weight, based on 100 parts by weight of the pulverized polymer.

The surface modification step may be performed at a temperature of 100° C. to 250° C. Further, the surface modification may be performed for 1 min to 120 min, 1 min to 100 min, or 10 min to 60 min. That is, in order to prevent a reduction in physical properties due to deterioration of the polymer particles by excessive reaction while inducing the minimal surface crosslinking reaction, the surface modification step may be performed under the above-described conditions.

Advantageous Effects

A method of preparing a superabsorbent polymer according to the present disclosure provides a superabsorbent polymer having an improved absorption rate while having superior centrifuge retention capacity (CRC) and absorbency under pressure (AUP).

DETAILED DESCRIPTION OF THE EMBODIMENTS

Hereinafter, preferred examples are provided for better understanding. However, these examples are provided for illustrative purposes only, and the present disclosure is not intended to be limited by these examples.

Example 1

About 5.0 g of N,N'-methylene-bis-acrylamide (first cross-linking agent) was added to and mixed with about 500 g of acrylic acid. Then, about 971.4 g of a 20% sodium hydroxide aqueous solution was added thereto to prepare a monomer composition (a degree of neutralization of acrylic acid-based monomer: 70 mol %).

The monomer composition was fed into a 5 L twin-armed kneader equipped with a sigma-type axis, and maintained at 40° C. and purged with nitrogen gas for 30 min to eliminate oxygen dissolved in the aqueous solution. Under stirring, about 50.1 g of a 0.2 wt % L-ascorbic acid aqueous solution, about 50.5 g of a sodium persulfate aqueous solution, and about 51.0 g of a 2.0 wt % hydrogen peroxide aqueous solution were added. Polymerization was initiated within 20 seconds, and a gel-type polymer was obtained.

Separately, fine particles of the superabsorbent polymer were prepared.

1000 g of the gel-type polymer and 150 g of the prepared fine particles were fed into a chopper, and pulverized for 5 min while mixing them using a shearing force to obtain a gel having a size of 2 mm to 10 mm.

The pulverized gel was spread as thick as about 30 mm on a stainless wire gauze having a hole size of 600 μm and dried in a hot air oven at 140° C. for 5 h. The dried gel thus obtained was pulverized with a grinder and then size-sorted through an ASTM standard sieve. As a result, a polymer having a particle size of 150 μm to 850 μm was obtained.

100 g of the obtained crosslinked polymer was uniformly blended with a surface crosslinking solution including 0.3 g of ethylene glycol diglycidyl ether (second crosslinking agent), 3 g of methanol, and 3 g of water. Then, the mixture was dried in a hot air oven at 140° C. for 30 min. The dry powder was size-sorted through an ASTM standard sieve to obtain absorbent polymer particles having a particle size of 150 μm to 850 μm.

Example 2

Absorbent polymer particles were obtained in the same manner as in Example 1, except that in the process of coarsely pulverizing the gel-type polymer, 1000 g of the gel-type polymer, 150 g of the fine particles, and 1.5 g of aluminum sulfate hydrate were fed into the chopper, and pulverized while mixing them using a shearing force.

Comparative Example 1

Absorbent polymer particles were obtained in the same manner as in Example 1, except that in the process of coarsely pulverizing the gel-type polymer, only the gel-type polymer was fed into the chopper without addition of the fine particles, and pulverized while mixing it using a shearing force.

Experimental Example

To evaluate physical properties of the absorbent polymers prepared in the examples and the comparative example, the following experiments were performed, and the results are given in the following Table 1.

(1) Centrifugal Retention Capacity (CRC)

CRC of the absorbent polymer was measured in accordance with EDANA WSP 241.2.

That is, each polymer W (g) (about 2.0 g) obtained in the examples and the comparative example was uniformly placed into a nonwoven-fabric-made bag, followed by sealing. Then, the bag was immersed in a physiological saline solution (0.9% by weight) at room temperature. After about 30 min, the bag was drained at 250 G for 3 min with a centrifuge, and the weight $W_2$ (g) of the bag was measured. Further, the same procedure was carried out using no polymer, and the resultant weight $W_1$ (g) was measured. Thus, CRC (g/g) was calculated from these weights thus obtained according to the following Equation:

$$\text{CRC (g/g)} = \{(W_2 - W_1 - W)/W\} \quad \text{[Mathematical Equation 1]}$$

wherein W represents the weight of the absorbent polymer, $W_1$ represents the weight of the absorbent polymer, which was measured after immersing a non-woven bag containing no absorbent polymer in a saline solution at room temperature for 30 min, and dehydrating the non-woven bag using a centrifuge at 250 G for 3 min, and $W_2$ represents the weight of the absorbent polymer, which was measured after immersing a non-woven bag containing the absorbent polymer in a saline solution for 30 min, and dehydrating the non-woven bag using a centrifuge at 250 G for 3 min.

(2) Absorbency Under Pressure (AUP)

AUP of the absorbent polymer was measured in accordance with EDANA method WSP 242.3.

That is, 400 mesh metal made of stainless steel was installed at the bottom of a plastic cylinder having an inner diameter of 60 mm. About 0.90 g of the absorbent polymer was uniformly spread on the metal mesh at room temperature and humidity of 50%. A piston to uniformly apply a load of 4.83 kPa (0.7 psi) was mounted thereon, in which the piston had an outer diameter of only a little smaller than 60 mm and made no gap with the inner wall surface of the cylinder, but was not hindered from moving up and down. At this time, the weight Wa (g) of the apparatus was measured.

A glass filter having a diameter of 90 mm and a thickness of 5 mm was mounted inside a Petri dish having a diameter of 150 mm, and then a physiological saline consisting of 0.90 wt % sodium chloride was added up to the same level as the top of the glass filter, on which a filter paper having a diameter of 90 mm was then mounted. The measuring apparatus was mounted on the filter paper, thereby getting the liquid absorbed under the load for 1 h. 1 h later, the weight Wb (g) was measured after lifting the measuring apparatus.

The absorbency under pressure (g/g) was calculated from Wa and Wb in accordance with the following equation:

$$\text{AUP (g/g)} = (Wb - Wa)/(\text{weight of absorbent polymer, g}) \quad \text{[Mathematical Equation 2]}$$

(3) Absorption Rate 50 ml of 0.9% saline solution and a magnetic bar (20*5 mm octagonal) were put in a 100 ml beaker. While the beaker was stirred at a speed of 600 rpm, 2.0 g of the absorbent polymer was fed into a produced vortex, and a stopwatch was activated at the same time. A time (unit: s) taken for the vortex to disappear and for the liquid surface to be completely level was measured.

TABLE 1

| | CRC (g/g) | AUP (g/g) | Absorption rate (s) |
|---|---|---|---|
| Example 1 | 33.6 | 22.7 | 76 |
| Example 2 | 33.1 | 23.3 | 31 |
| Comparative Example 1 | 33.5 | 23.4 | 93 |

Referring to Table 1, the absorbent polymers according to the examples were found to have greatly improved absorption rate while having CRC and AUP similar to those of the comparative example.

With regard to the absorbent polymer of Example 1, a binding force between the water-containing gel polymer and the superabsorbent polymer powder was weak, and thus AUP was slightly reduced, and improvement in absorption rate was not relatively large. It is likely that this result was because of separation between the water-containing gel polymer and the superabsorbent polymer powder. As in Example 2, when metal sulfate was used together, the binding force between the water-containing gel polymer and the superabsorbent polymer powder was increased, and therefore the absorption rate was greatly improved while maintaining CRC and AUP.

The invention claimed is:

1. A method of preparing a superabsorbent polymer, the method comprising:
polymerizing and crosslinking a monomer composition having acrylic acid-based monomers having acidic groups which are at least partially neutralized, in the presence of a polymerization initiator and a first crosslinking agent, to form a water-containing gel polymer;
coarsely pulverizing the water-containing gel polymer;
drying the coarsely pulverized water-containing gel polymer;
pulverizing the dried polymer; and
surface-modifying the pulverized polymer by a second crosslinking agent,
wherein the coarse pulverization of the water-containing gel polymer is conducted while mixing the water-containing gel polymer with a metal sulfate, and a powder of the superabsorbent polymer that is obtained during the preparation process of the superabsorbent polymer, and the powder of the superabsorbent polymer is uniformly distributed on the surface of the coarsely pulverized water-containing gel polymer.

2. The method of preparing the superabsorbent polymer of claim 1, wherein the powder of the superabsorbent polymer comprises fine particles having a particle size of 10 μm to 150 μm obtained during the preparation process of the superabsorbent polymer, granules of the fine particles, or a mixture of the fine particles and the granules.

3. The method of preparing the superabsorbent polymer of claim 1, wherein the powder of the superabsorbent polymer is mixed in an amount of 3 parts by weight to 40 parts by weight, based on 100 parts by weight of the water-containing gel polymer.

4. The method of preparing the superabsorbent polymer of claim 1, wherein the metal sulfate is mixed in an amount of 0.01 parts by weight to 20 parts by weight, based on 100 parts by weight of the water-containing gel polymer.

5. The method of preparing the superabsorbent polymer of claim 1, wherein the metal sulfate is one or more compounds selected from the group consisting of zinc sulfate, magnesium sulfate, aluminum sulfate, iron sulfate, and zirconium sulfate.

6. The method of preparing the superabsorbent polymer of claim 1, wherein the coarsely pulverized water-containing gel polymer has an average particle size of 2 mm to 10 mm.

7. The method of preparing the superabsorbent polymer of claim 1, wherein the acrylic acid-based monomer is a compound represented by the following Chemical Formula 1:

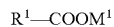  [Chemical Formula 1]

wherein $R^1$ is an alkyl group having an unsaturated bond and having 2 to 5 carbon atoms, and
$M^1$ is a hydrogen atom, a monovalent metal, a divalent metal, an ammonium group, or an organic amine salt.

8. The method of preparing the superabsorbent polymer of claim 1, wherein the drying of the coarsely pulverized water-containing gel polymer is performed at a temperature of 120° C. to 250° C.

9. The method of preparing the superabsorbent polymer of claim 1, wherein the first crosslinking agent is one or more compounds selected from the group consisting of N,N'-methylenebisacrylamide, trimethylolpropane tri(meth)acrylate, ethylene glycol di(meth)acrylate, polyethylene glycol (meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, and ethylene carbonate.

10. The method of preparing the superabsorbent polymer of claim 1, wherein, in the surface modification of the pulverized polymer, a surface crosslinking reaction of the pulverized polymer is performed by mixing the pulverized polymer with 0.001 parts to 5 parts by weight of the second crosslinking agent, based on 100 parts by weight of the pulverized polymer.

11. The method of preparing the superabsorbent polymer of claim 1, wherein the second crosslinking agent is one or more compounds selected from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylol propane, pentaerythritol, sorbitol, calcium hydroxide, magnesium hydroxide, aluminum hydroxide, iron hydroxide, calcium chloride, magnesium chloride, aluminum chloride, and iron chloride.

* * * * *